United States Patent [19]

Chi

[11] Patent Number: 5,492,261
[45] Date of Patent: Feb. 20, 1996

[54] STAPLER HAVING PROTECTING MEANS FOR PREVENTION OF INJURY TO FINGERS OF A USER

[75] Inventor: William H. N. Chi, Taichung Hsien, Taiwan

[73] Assignee: Stanley-Bostich, Inc., East Greenwich, R.I.; a part of interest

[21] Appl. No.: 389,265

[22] Filed: Feb. 16, 1995

[51] Int. Cl.$^6$ .................................................... B25C 5/06
[52] U.S. Cl. ......................... 227/128; 227/134; 227/156
[58] Field of Search ................................. 227/132, 134, 227/128, 156

[56] References Cited

U.S. PATENT DOCUMENTS

| | | | |
|---|---|---|---|
| 2,310,530 | 2/1943 | Krantz | 227/156 |
| 2,499,843 | 3/1950 | Berger | 227/134 |
| 2,866,973 | 1/1959 | Ruskin | 227/128 |
| 3,103,012 | 9/1963 | Kohen et al. | 227/134 |
| 3,144,653 | 8/1964 | Kohen | 227/134 |
| 4,025,031 | 5/1977 | Chi | 227/132 |
| 4,225,075 | 9/1980 | Chi | 227/132 |

*Primary Examiner*—Scott A. Smith
*Attorney, Agent, or Firm*—Peterson, Wicks, Nemer & Kamrath

[57] ABSTRACT

A stapler having protecting devices for preventing injury to fingers of a user generally includes a base having two side walls extending upwardly therefrom, a staple magazine pivotally engaged between the side walls, a connecting portion engaged to an end of the staple magazine between the side walls and a handle pivotally engaged to the staple magazine, the protecting devices including a finger element and a saddle element, the finger element disposed to an under side of the handle and having an extending portion extending downwardly therefrom so as to keep the user's finger from entering an gap defined between the handle and the staple magazine and, the saddle element mounted to the connecting portion so as to keep the user's hand from entering a gap defined between the connecting portion and the handle.

6 Claims, 7 Drawing Sheets

STAPLER HAVING PROTECTING MEANS FOR PREVENTION OF INJURY TO FINGERS OF A USER

BACKGROUND OF THE INVENTION

The present invention relates to a stapler, and more particularly, to a stapler having protecting means for prevention of injury to fingers of a user.

Figure 1:
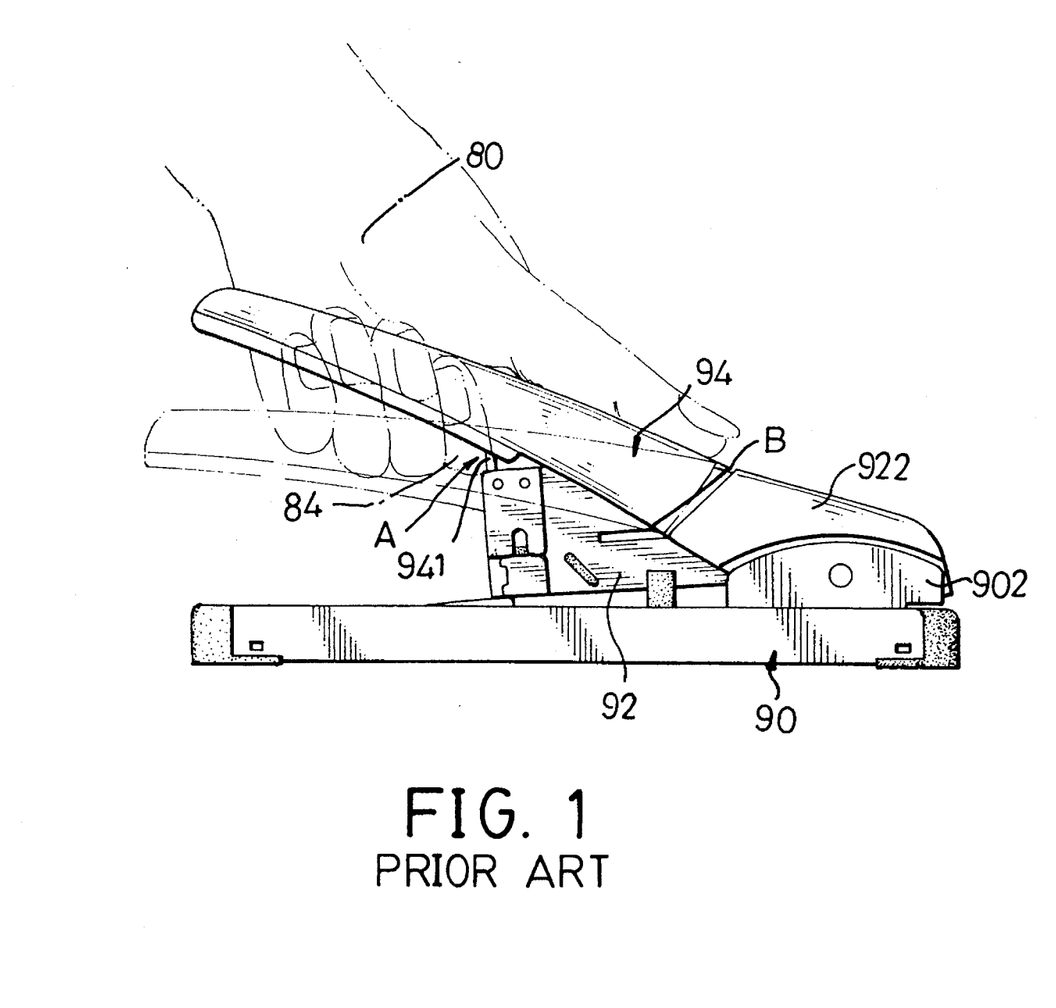
FIG. 1 is a side elevational view of a conventional stapler wherein a user's hand and a movement of a handle of the stapler are shown in phantom lines.
Figure 2:
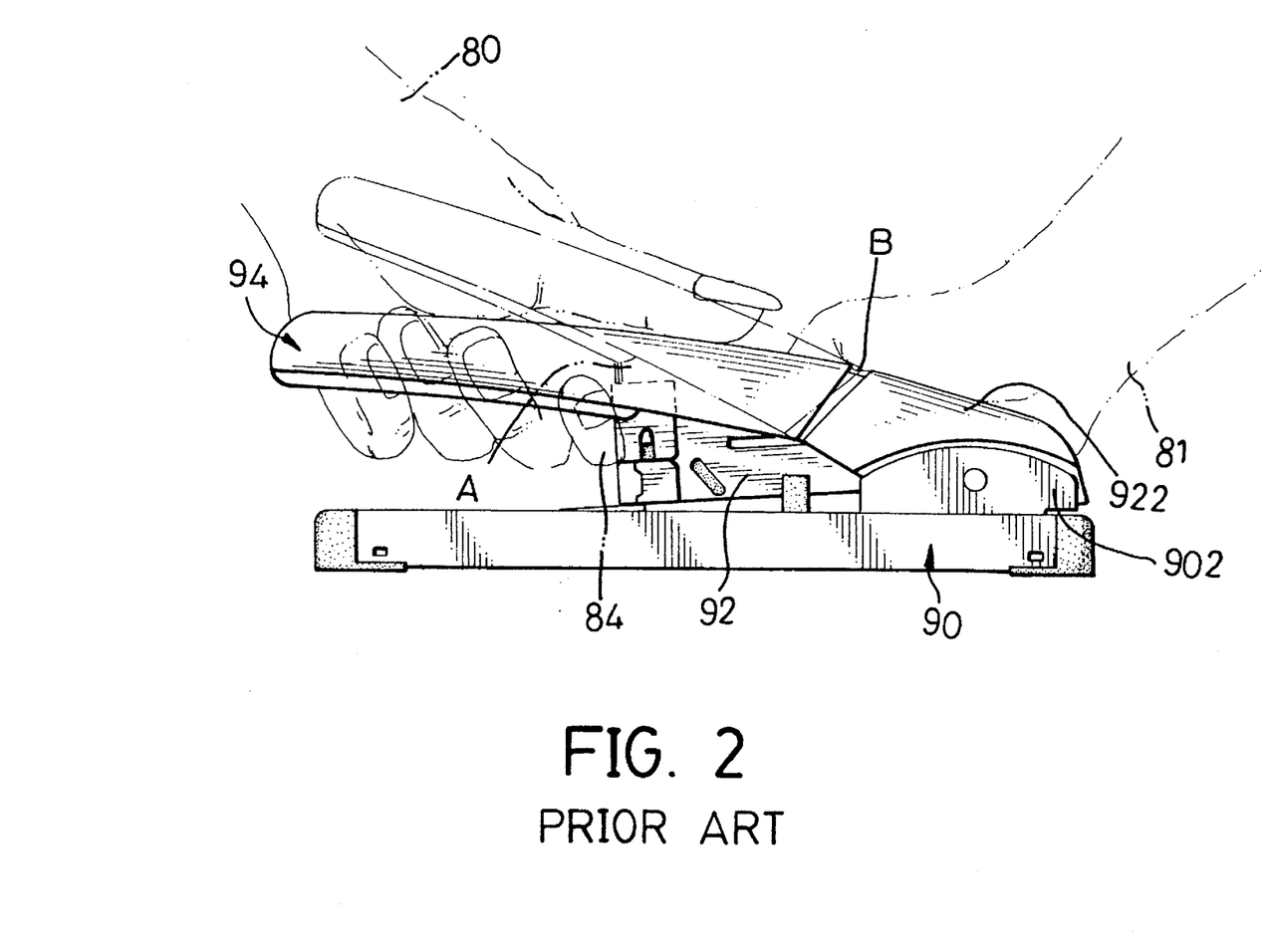
FIG. 2 is a side elevational view of the conventional stapler as shown in FIG. 1 wherein the user's hands and the movement of the handle of the stapler are shown in phantom lines.

Referring to FIGS. 1 and 2, the stapler shown in FIGS. 1 and 2 is the kind of being used to staple sheets of paper of a certain thickness together, generally includes a base 90, two walls 902 (only one shown) extending upwardly from an end of the base 90, a staple magazine 92 engaged to the walls 902 wherein staples (figures not shown) are received in the staple magazine 92, a connecting portion 922 pivotally engaged to an end of the staple magazine 92 and located between the staple magazine 92 and the walls 902, a handle 94 pivotally engaged to the staple magazine 92 and defining a gap B between the handle 94 and the connecting portion 922 and, an ejector 941 extending downwardly from an under side of the handle 94 so as to eject a stapler from the staple magazine 92 when the handle 94 is pushed downwardly. A gap A is necessarily defined between the under side of the handle 94 and an upper end of the staple magazine 92, however, as shown in FIG. 1, a user's finger, especially part of the index finger 84 of a hand 80, could be entered into the gap A when he/she grasps the handle 94 for the sake of providing a sufficient downward force thereto, thus results in hurting of the index finger 84 when he/she pushes the handle 94 down. Furthermore, as shown in FIG. 2, the user especially when the sheets of paper to be stapled together have a certain thickness and need to be held in place for a convenience of stapling, the user uses one hand 80 to grasp the handle 94 and the other hand 81 to hold the connecting portion 922, thus after completing a pushing-down action, when the handle 94 is biased upwardly, the hand 81 hold the connecting portion 922 could be pinched between edges defining the gap B.

The present invention intends to provide a stapler having protecting means to mitigate and/or obviate the above-mentioned problems.

SUMMARY OF THE INVENTION

The present invention provides a stapler having protecting means for prevention of injury to fingers of a user, the stapler generally includes a base having two side walls extending upwardly therefrom between which a staple magazine pivotally engaged, a connecting portion engaged to an end of the staple magazine between the staple magazine and the side walls and, a handle pivotally engaged to the staple magazine, the protecting means including a finger element and a saddle element, the finger element disposed to an under side of the handle and having an extending portion extending downwardly therefrom so as to keep the user's finger from entering a gap defined between the handle and the staple magazine and, the saddle element mounted to the connecting portion so as to keep the user's hand from entering a gap defined between the connecting portion and the handle.

It is an object of the present invention to provide a stapler having protecting means to keep user's finger or hand from being injured by keeping the fingers from entering into gaps defined between elements of the stapler when using.

Other objects, advantages, and novel features of the invention will become more apparent from the following detailed description when taken in conjunction with the accompanying drawings.

DETAILED DESCRIPTION OF THE PREFERRED EMBODIMENT

Figure 3:
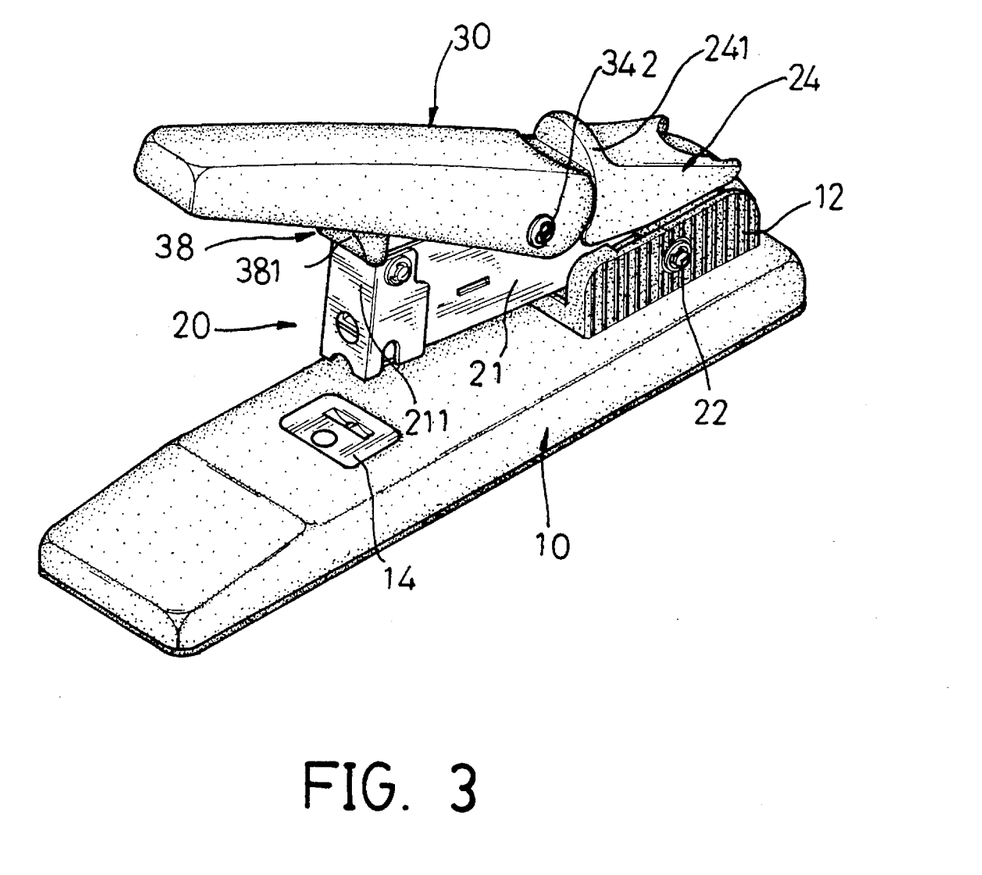
FIG. 3 is a perspective view of a stapler having protecting means in accordance with the present invention.
Figure 4:
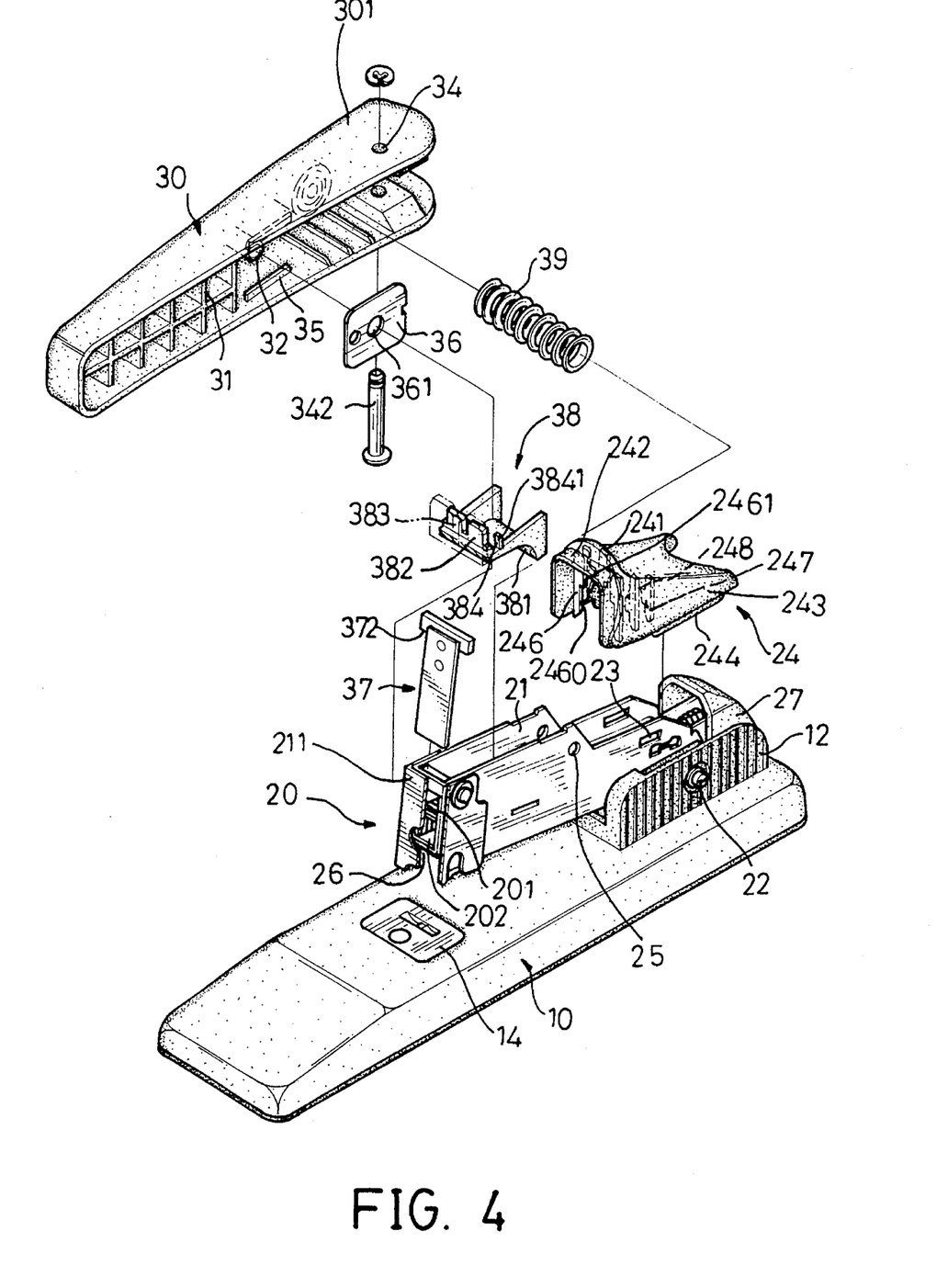
FIG. 4 is an exploded view of the stapler having protecting means in accordance with the present invention.

Referring to the drawings and initially to FIGS. 3 and 4, a stapler in accordance with the present invention generally includes a base 10, a staple magazine 20, a connecting portion 27, a handle 30 and a protecting means which comprises a finger element 38 and a saddle element 24. The base 10 has a first end and a second end, the first end thereof having two side walls 12 extending therefrom separately and in parallel from each other and the second end thereof having an anvil 14 disposed to an upper surface thereof. The staple magazine 20 is designed for receiving staples 201 therein and is composed of a bottom 202, two side plates 21 separately extending from the bottom 202 and a U-shaped end plate 211, the staple magazine 20 has a first end and a second end, the first end thereof pivotally engaged between the two side walls 12 by a pin 22 and the second end thereof having the end plate 211 disposed thereto so as to define an ejection opening 26 between the end plate 211 and the bottom, the ejection opening 26 corresponding to the anvil 14. The connecting portion 27 is slidably engaged to the first end of the staple magazine 20.

The handle 30, being a U-shaped cross-section composed of an under side and two extending walls 301, has a first end and a second end, the first end thereof pivotally engaged to the staple magazine 20 by a pin 342 extending through holes 34 defined in each of the extending walls 301 and holes 25 defined in each of the side plates 21 and a tubular portion 32 extending downwardly from the under side of the handle 30, two protrusions 35 respectively extending transversely from each inner side of the extending wall 301 and a plurality of ribs 31 extending from the under side of the handle 30. An ejector 37 generally is a rectangular element and has a bar 372 extending transversely from an upper edge thereof and a spring 39 disposed between the under side of the handle 30 and the bottom 202 of the staple magazine 20.

The saddle element 24 has a first end and a second end, the second end thereof having an inverted U-shaped flange 242 extending transversely therefrom and a stop 241 extending upwardly from an upper portion thereof and above an abutment of the first end of the handle 30 and the connecting portion 27, the saddle element 24 having two sides 243 extending downwardly therefrom, each side 243 having a first rib 246 and two second ribs 247 extending from an inner side thereof, the first rib 246 having a recess 2460 defined therein and so forming a shoulder part 2461 and the second rib 247 having a boss 248 extending transversely therefrom. The saddle element 24 is mounted to the connecting element 27 by inserting two tongues 244 which extend downwardly from the two sides 243 of the saddle element 24 into an area between the side walls 12 and the connecting element 27 such that the shoulder part 2461 is engaged to an upper portion of the staple magazine 20 of the side plate 21 and the boss 248 is received in a transverse slot 23 defined in each of the side plates 21.

Figure 5:
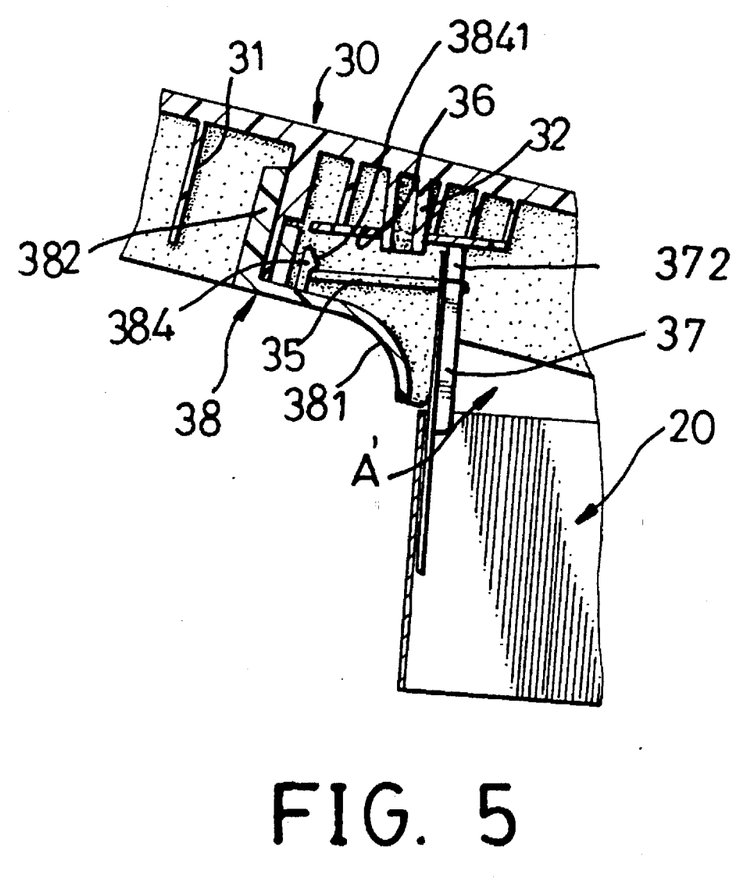
FIG. 5 is a cross-sectional view of a part of an engagement between a finger element and a handle of the present invention.

The finger element 38 has a first end and a second end, the second end thereof having two rows of plates 382, 383 extending therefrom, two hook elements 384 extending upwardly from each of two upper sides of the second end of the finger element 38, the first end thereof having an extending portion 381 extending downwardly therefrom, the extending portion 381 located beside the ejector 37 and positioned closer to the second end of the handle 30 than the ejector 37. Referring further to FIG. 5, a plate 36 having a hole 361 defined therein is disposed to the under side of the handle 30 and the tubular portion 32 of the handle 30 passes through the hole 36, the ejector 37 is disposed to the handle 30 by engaging the two ends of the bar 372 of the ejector 37 force-fitted between the protrusions 35 and the plate 36 such that the finger element 38 is disposed to the under side of the handle 30 and abuts the ejector 37, one rib 31 of the handle 30 is received between the two rows of plates 382, 383 and a hook portion 3841 of each of the hook elements 384 is engaged to an end of the protrusion 35 such that the extending portion 381 extends to cover a first gap A' defined between the handle 30 and the staple magazine 20.

Figure 6:
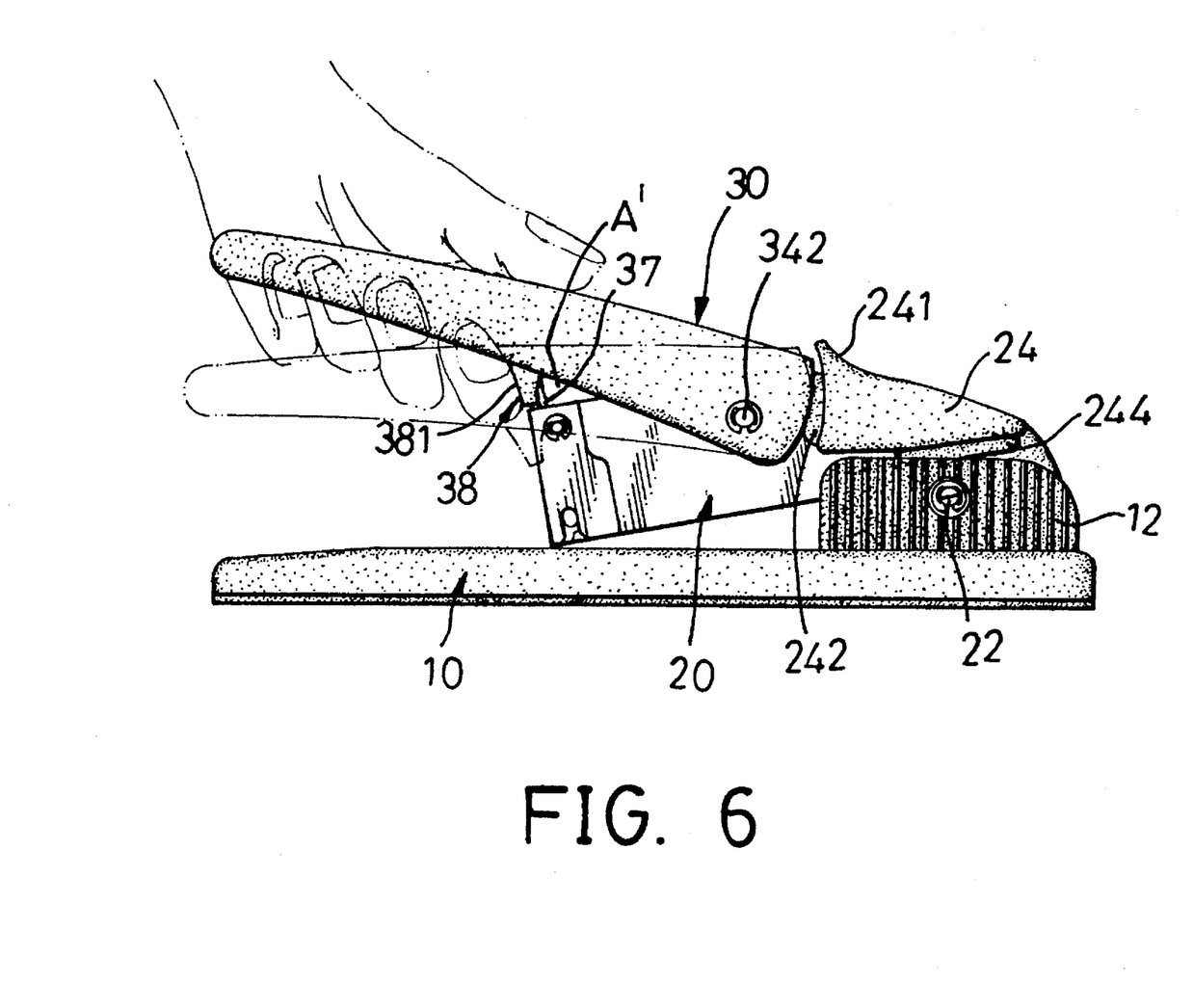
FIG. 6 is a side elevational view of the stapler of the present invention wherein a user's hand and a movement of the handle of the stapler are shown in phantom lines.
Figure 7:
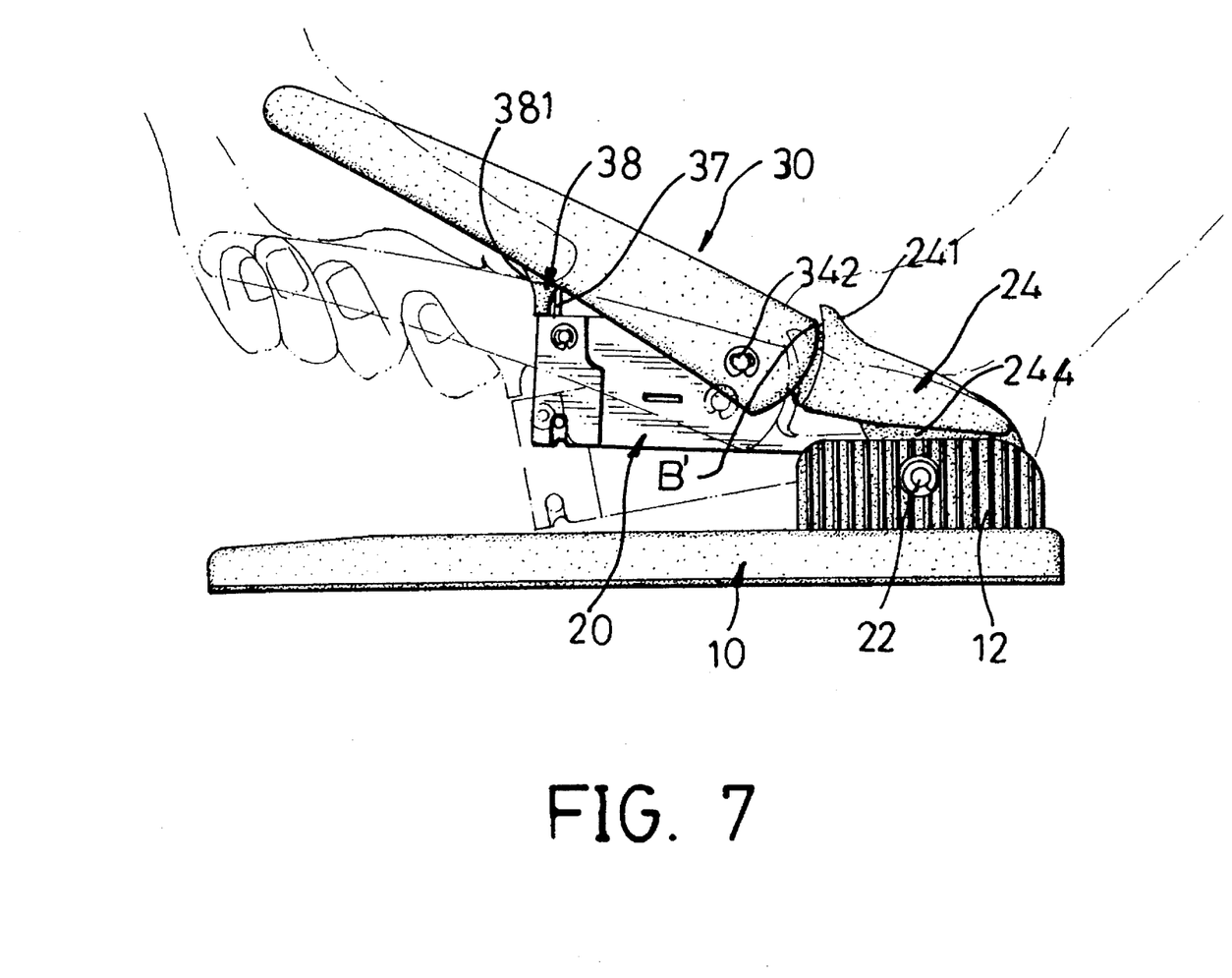
FIG. 7 is a side elevational view of the stapler of the present invention wherein the user's hands and the movement of the handle of the stapler are shown in phantom lines.

Referring to FIGS. 6 and 7, when using the stapler, a user's index finger of one hand is put against the extending portion 381 of the finger element 38 so as to be protected from hurting by entering the index finger into the first gap A' defined between the handle 30 and the staple magazine 20, similarly, when using the stapler with both of the user's hands, the other hand holds the saddle element 24 and an arc portion between the index finger and the thumb put against the stop 241 so as to avoid from entering into a second gap B' defined between the handle 30 and the connecting portion 27. Accordingly, the present invention provides the stapler which has protecting means to protect user's hand(s) from being injured by keeping the user's hand(s) from entering into the first and the second gaps A', B' when using the stapler.

Although the invention has been explained in relation to its preferred embodiment, it is to be understood that many other possible modifications and variations can be made without departing from the spirit and scope of the invention as hereinafter claimed.

I claim:
1. A stapler having protecting means for prevention of injury to fingers of a user, and comprising:
   a base having a first end and a second end, said first end thereof having two side walls extending separately and in parallel from each other therefrom, and said second end thereof having an anvil disposed to an upper surface thereof;
   a staple magazine having a first end and a second end, said first end thereof pivotally engaged ween said two side walls and said second end thereof having an ejection opening defined therein corresponding to said anvil;
   a handle having a first end and a second end, said first end thereof pivotally engaged to said staple magazine, said second end thereof having an ejector extending downwardly from an under side thereof,
   said protecting means being a finger element disposed to an under side of said handle and having an extending portion extending downwardly therefrom, said extending portion located beside said ejector and positioned closer to said second end of said handle than said ejector, and
   said finger element having two hook elements extending upwardly therefrom, said handle having a bottom and two extending walls which extend from said bottom and each of said two extending walls of said handle having a protrusion extending transversely therefrom so as to engage to said hook element to securely fix said finger element thereto.

2. A stapler having protecting means from hurting fingers of a user, and comprising:
   a base having a first end and a second end, said first end thereof having two side walls extending separately and in parallel from each other therefrom, said second end thereof having an anvil disposed to an upper surface thereof;
   a staple magazine having a first end and a second end, said first end thereof pivotally engaged between said two side walls, a connecting portion engaged to said first end of said staple magazine and said second end thereof having an ejection opening defined therein corresponding to said anvil;
   a handle having a end and a second end, said first end thereof pivotally engaged to said staple magazine, said second end thereof having an ejector extending downwardly from an under side thereof, and
   said protecting means comprising a saddle element and a finger element, said saddle element disposed to said staple magazine, a first end of said saddle element mounted to said connecting portion and a second end of said saddle element having a stop extending upwardly therefrom, said finger element disposed to an under side of said handle and having an extending portion extending downwardly therefrom, said extending portion located beside said ejector and positioned closer to said second end of said handle than said ejector, and
   said finger element having two hook elements extending upwardly therefrom, said handle having a bottom and two extending walls which extend from said bottom and each of said two extending walls of said handle having a protrusion extending transversely therefrom such that said hook element is engaged to said protrusion and said finger element is securely engaged to said handle.

3. A stapler having protecting means from hurting fingers of a user, and comprising:
   a base having a first end and a second end, said first end thereof having two side walls extending separately and in parallel from each other therefrom, said second end thereof having an anvil disposed to an upper surface thereof;
   a staple magazine having a first end and a second end, said first end thereof pivotally engaged between said two side walls, a connecting portion engaged to said first end of said staple magazine and said second end thereof having an ejection opening defined therein corresponding to said anvil;

a handle having a first end and a second end, of said first end thereof pivotally engaged to said staple magazine, said second end thereof having an ejector extending downwardly from an under side thereof, and said protecting means comprising a saddle element and a finger element, said saddle element disposed to said staple magazine, a first end of said saddle element mounted to said connecting portion and a second end of said saddle element having a stop extending upwardly therefrom, said finger element disposed to an under side of said handle and having an extending portion extending downwardly therefrom, said extending portion located beside said ejector and positioned closer to said second end of said handle than said ejector, and said staple magazine having two side plates extending therefrom, each of said side plates having a transverse slot defined therein, said saddle element having two sides extending downwardly therefrom, each said side having at least one first rib and at least one second rib, said first rib having a recess defined therein and formed a shoulder part so as to engage to an upper portion of said side plate of said staple magazine and said second rib having a boss extending transversely therefrom so as to be inserted in said transverse slot of said staple magazine.

4. A stapler having protecting means for prevention of injury to fingers of a user, and comprising:

a base having a first end and a second end, said first end thereof having two side walls extending separately and in parallel from each other therefrom, and said second end thereof having an anvil disposed to an upper surface thereof;

a staple magazine having a first end and a second end, said first end thereof pivotally engaged between said two side walls and said second end thereof having an ejection opening defined therein corresponding to said anvil;

a handle having a first end and a second end, said first end thereof pivotally engaged to said staple magazine, said second end thereof having an ejector extending downwardly from an under side thereof, and said protecting means being a finger element disposed to an under side of said handle and having an extending portion extending downwardly therefrom, said extending portion located beside said ejector and positioned closer to said second end of said handle than said ejector, said finger element having a first end and a second end, said first end thereof having two rows of plates extending therefrom, said under side of said handle has at least one rib extending downwardly therefrom so as to be securely received between said two rows of plates of said finger element.

5. A stapler having protecting means for prevention of injury to fingers of a user, and comprising:

a base having a first end and a second end, said first end thereof having two side walls extending separately and in parallel from each other therefrom, said second end thereof having an anvil disposed to an upper surface thereof;

a staple magazine having a first end and a second end, said first end thereof pivotally engaged between said two side walls, a connecting portion engaged to said first end of said staple magazine and said second end thereof having an ejection opening defined therein corresponding to said anvil, said staple magazine having two side plates extending therefrom, each of said side plates having a transverse slot defined therein, said saddle element having two sides extending downwardly therefrom, each said side having at least one first rib and at least one second rib, said first rib having a recess defined therein and forming a shoulder part so as to engage to an upper portion of said side plate of said staple magazine and said second rib having a boss extending transversely therefrom so as to be inserted in said transverse slot of said staple magazine;

a handle having a first end and a second end, said first end thereof pivotally engaged to said staple magazine, said second end thereof having an ejector extending downwardly from an under side thereof, and said protecting means being a saddle element and disposed to said staple magazine, a first end of said saddle element mounted to said connecting portion and a second end of said saddle element having a stop extending upwardly therefrom.

6. A stapler having protecting means from hurting fingers of a user, and comprising:

a base having a first end and a second end, said first end thereof having two side walls extending separately and in parallel from each other therefrom, said second end thereof having an anvil disposed to an upper surface thereof;

a staple magazine having a first end and a second end, said first end thereof pivotally engaged between said two side walls, a connecting portion engaged to said first end of said staple magazine and said second end thereof having an ejection opening defined therein corresponding to said anvil;

a handle having a first end and a second end, said first end thereof pivotally engaged to said staple magazine, said second end thereof having an ejector extending downwardly from an under side thereof, and said protecting means comprising a saddle element and a finger element, said saddle element disposed to said staple magazine, a first end of said saddle element mounted to said connecting portion and a second end of said saddle element having a stop extending upwardly therefrom, said finger element disposed to an under side of said handle and having an extending portion extending downwardly therefrom, said extending portion located beside said ejector and positioned closer to said second end of said handle than said ejector, said finger element having a first end and a second end, said first end thereof having two rows of plates extending therefrom, said under side of said handle having at least one rib extending downwardly therefrom so as to be securely received between said two rows of plates of said finger element.

* * * * *